USOO5590313A

United States Patent [19]
Reynolds et al.

[11] Patent Number: 5,590,313
[45] Date of Patent: Dec. 31, 1996

[54] MULTIPLE PROTOCOL DEVICE INTERFACE SUBSYSTEM AND METHOD

[75] Inventors: Robert A. Reynolds, Pflugerville; David W. Sheffield, Austin, both of Tex.

[73] Assignee: International Business Machines Corporation, Armonk, N.Y.

[21] Appl. No.: 269,338

[22] Filed: Jun. 30, 1994

[51] Int. Cl.$^6$ .............................. G06F 13/14; G06F 13/42
[52] U.S. Cl. ........................... 395/500; 395/831; 364/239
[58] Field of Search ............................ 364/238.2, 239.9, 364/239, 926.93, 940; 395/200.01, 200.02, 200.2, 828, 831, 882, 883, 500

[56] References Cited

U.S. PATENT DOCUMENTS

| | | | |
|---|---|---|---|
| 4,493,021 | 1/1985 | Agrawal et al. | 395/200.16 |
| 4,631,666 | 12/1986 | Harris et al. | 364/200 |
| 4,701,848 | 10/1987 | Clyde | 364/900 |
| 4,803,481 | 2/1989 | Mueller et al. | 370/91 |
| 4,805,090 | 2/1989 | Coogan | 364/200 |
| 4,914,653 | 4/1990 | Bishop et al. | 370/85.6 |
| 4,945,480 | 7/1990 | Clark et al. | 364/256.3 |
| 4,975,828 | 12/1990 | Wishnewsky et al. | 364/228.5 |
| 4,975,829 | 12/1990 | Clarey et al. | 364/284.2 |
| 5,058,110 | 10/1991 | Beach et al. | 375/37.7 |
| 5,063,494 | 11/1991 | Davidowski et al. | 395/800 |
| 5,179,666 | 1/1993 | Rimmer et al. | 395/275 |
| 5,210,874 | 5/1993 | Karger | 395/650 |
| 5,249,279 | 9/1993 | Schmenk et al. | 395/425 |
| 5,264,958 | 11/1993 | Johnson | 364/239 |
| 5,367,646 | 11/1994 | Pardillos et al. | 364/239 |

OTHER PUBLICATIONS

Woodside et al., "The Effect of Buffering Strategies on Protocol Execution Performance", IEEE Trans on Comm, vol. 37, No. 6, Jun. 1989, pp. 545–554.

Druschel et al., "Fbnfs: A High–Bandwidth Cross–Domain Transfer Facility", SIGOPS '93, Dec. 1993 pp. 189–202.

Clark et al. "An Analysis of TCP Processing Overhead", IEEE Comm, 1989, pp. 23–29.

(List continued on next page.)

*Primary Examiner*—Kevin J. Teska
*Assistant Examiner*—Tyrone V. Walker
*Attorney, Agent, or Firm*—Robert M. Carwell

[57] ABSTRACT

A subsystem and method permits multiple protocols, to run simultaneously over a single adapter with minimal overhead.

First interface structures are defined having similar component properties of a buffer address, buffer length, and cross-memory descriptor. The first structures are chainable, whereby data may be gathered from or scattered to multiple discontiguous data buffers for a single operation. A common structure completed by protocol heads has a pointer to the chain of first interface structures. For each control element, multiple buffer descriptors are provided to describe the various user buffers. The chain of multiple buffer structures contains pointers to the first structures employed to map buffers and obtain DMA addresses for an adapter. A layered architecture is provided for while allowing flexibility of utilizing current interfaces. Multiple protocols running over a single adapter driver are effected wherein the same protocol head code may run over a different adapter supporting the interface.

Buffer, DMA management, and adapter handling are centralized in the adapter driver, allowing for more efficient allocation of system resources. The hardware interface is isolated in the adapter driver whereby changes for an integrated adapter may be isolated to one section of code.

10 Claims, 4 Drawing Sheets

OTHER PUBLICATIONS

La Porta et al., "Architectures, Features, and Implementation of High Speed Transport Protocols", IEEE Network, May 1991, pp. 14–22.

Smith et al., "Giving Application to Gbfs Networking", IEEE Network, Jul. 1993, pp. 44–52.

Clark et al., "Multi–Protocol Architectures as a Paradigm for Achieving Inter–Operability", IEEE, 1993, pp. 136–143.

Banks et al., "A High–Performance Network Architecture for a PA–RISC Workstation", IEEE Jour on Areas in Communications, vol. 11, No. 2, Feb. 1993, pp. 191–202.

Huang et al., "A Refined Cut–Through Buffer Management Scheme for Layered protocol Stacks", IEEE Comm., Mar. 1994, pp. 82–85.

Dalton et al, "Afterburner", IEEE Network, Jul. 1993, pp. 36–43.

Druschel et al., "Network Subsystem Design", IEEE Network, pp. 8–17.

MULTIPLE PROTOCOL DEVICE INTERFACE SUBSYSTEM AND METHOD

TECHNICAL FIELD

This invention relates to subsystems for use with computers, and, more particularly, to device interface subsystems in multiprotocol environments.

BACKGROUND OF THE INVENTION

In modern computing systems, it has become commonplace to expand their use to a wide variety of environments with diversely differing applications and protocols. As an example, systems are being required to support both media and communications applications and protocols such as fiber channel subsystems supporting IPI-3 and SCSI or TCP/IP, respectively.

While the role of the computer is expanding to meet these ever-increasing needs, there are nevertheless severe constraints continuously being imposed on the industry. Users, while requiring increased versatility and functionality, nevertheless are simultaneously now demanding that it be delivered at lower and lower costs.

As a representative example of the problems this can cause, in some applications it is necessary to provide a single adapter which may support both media and communication applications. This is but one illustration of the operation of these cost constraints wherein it is simply not feasible to provide separate adapters for media, communications, and other applications. Rather there is a need to provide a single multi-purpose adapter which may support these differing applications and their associated protocols. Nevertheless, there are severe problems associated with providing a single device driver interface for a single adapter which could support two or more drastically different application and protocol types such as media and communications.

In passing, it will be helpful in order to understand the importance of the invention in dealing with multiple protocols and the problems associated with the wide variances and characteristics of such protocols, to briefly highlight the differences between, example, media and communication protocols.

Media protocols typically involved transmitting data having the same block and link size wherein writes and reads are encountered, e.g. a write command may be transmitted and a fixed amount of data be expected in return. In contrast, communication protocols typically have the characteristic that data will be received in unknown quantities and in unknown times unsolicited e.g. asynchronously. Although the implementation herein described has been with respect to the different protocols being a media and communication protocol with associated BUF and MBUF structures the invention is not intended to be so limited. The invention admits to application of multiple protocols utilizing different structures in their interfaces which have the aforementioned three common links, namely a pointer to data, the length of the data, and the cross/memory descriptor for setting up DMA. Accordingly any protocol using different structure in the path may also be advantageously combined to communicate with the same driver in accordance with the teaching of the invention utilizing the different structures so long as the three elements are present therein.

In a more generic sense, the media and the communication and protocols may be seen to be distinguished by whether asynchronous or synchronous data is handled and whether it is fixed or variable data block size. The different protocols arise from the need to provide different structures to efficiently control management of data having these variable characteristics, thereby giving rise to media protocols employing the BUF structures and communication protocols employing MBUF structures.

A conventional approach to such a problem of supporting multiple protocols was to provide for a single data structure and to copy data between software layers. However, as is well known in the art, a key to successful high-performance interfaces, (as is required in media and communication applications, for example,) is to do just the opposite, namely to avoid copying data between software layers.

An alternate approach taken in the prior art to avoid the performance penalty associated with recopying of data was to provide a different architecture wherein device drivers did not exist in the kernel. An example of this was the System Control Block (SCB) Architecture. Data was provided in SCB format and passed down in the manner to be described shown in FIG. 2 as their interfaces. The approach taken in such a system was to rewrite the protocol stack code to work on a single device driver. Not only did this approach suffer the serious drawback of requiring reimplementation of substantial portions of code, but their performance hits were nevertheless even still encountered resulting from instances of copying of data.

Although attempts have been made to provide in some platforms for a common device driver interface structure for media and communication protocols for example (such as that provided by SCB for use with PS/2 Computers produced by the IBM Corporation), in other environments the problem has not yet even been addressed at all. Thus, no common device driver interface structure for multiple protocols such as media and communication even exist presently for UNIX-Based Systems.

From the foregoing, it is readily apparent that a system and method was desired for effecting a multiple protocol device interface subsystem wherein the necessity to copy data between software layers was avoided.

It was yet another object of the invention to provide a subsystem which could be utilized with a single adapter in an environment running media and application programs which was cost effective and easy to implement.

Still a further object of the invention was to provide for a device driver subsystem interface which could be used in a multi-protocol environment wherein pre-existing core structures could be utilized, obviating the need to rewrite device driver code to new structures.

Yet a further object was to provide such a multi-purpose interface which yielded high performance otherwise difficult to obtain with conventional data copying techniques.

These and other objects are achieved by the subject invention, a more detailed description of which may be obtained with reference to the following figures wherein:

SUMMARY OF THE INVENTION

A system and method is provided permitting multiple protocols, including media and communications, to run simultaneously over a single adapter with minimal overhead.

First interface structures to media and communications devices are defined having similar respective component properties of a buffer address, buffer length, and cross-memory descriptor for mapping the respective buffer for DMA. The first structures are chainable, whereby data may be gathered from or scattered to multiple discontiguous data buffers for a single operation. A common structure is provided that a protocol head completes with a pointer to a chain of the first interface structures. The architecture is structured such that for each control element, multiple buffer descriptors may be provided to describe the various user buffers.

This chain of multiple buffer structures contain pointers to the first structures or any other structure to be supported, such information being employed by an adapter driver to map buffers and obtain DMA addresses for the adapter. In this manner, advantages of a layered architecture are provided while allowing flexibility of utilizing current interfaces. Facility is thereby provided for multiple protocols running over a single adapter driver wherein the same protocol head code may run over a different adapter supporting the interface.

The system and method further provides for integration into existing architecture. The buffer and DMA management, and adapter handling may also thereby be centralized in the adapter driver, allowing for more efficient allocation of system resources than otherwise achieved by distribution of this function. The hardware interface is also isolated in the adapter driver whereby changes for an integrated adapter may be isolated to one section of code.

DETAILED DESCRIPTION OF THE PREFERRED EMBODIMENT

Figure 1:
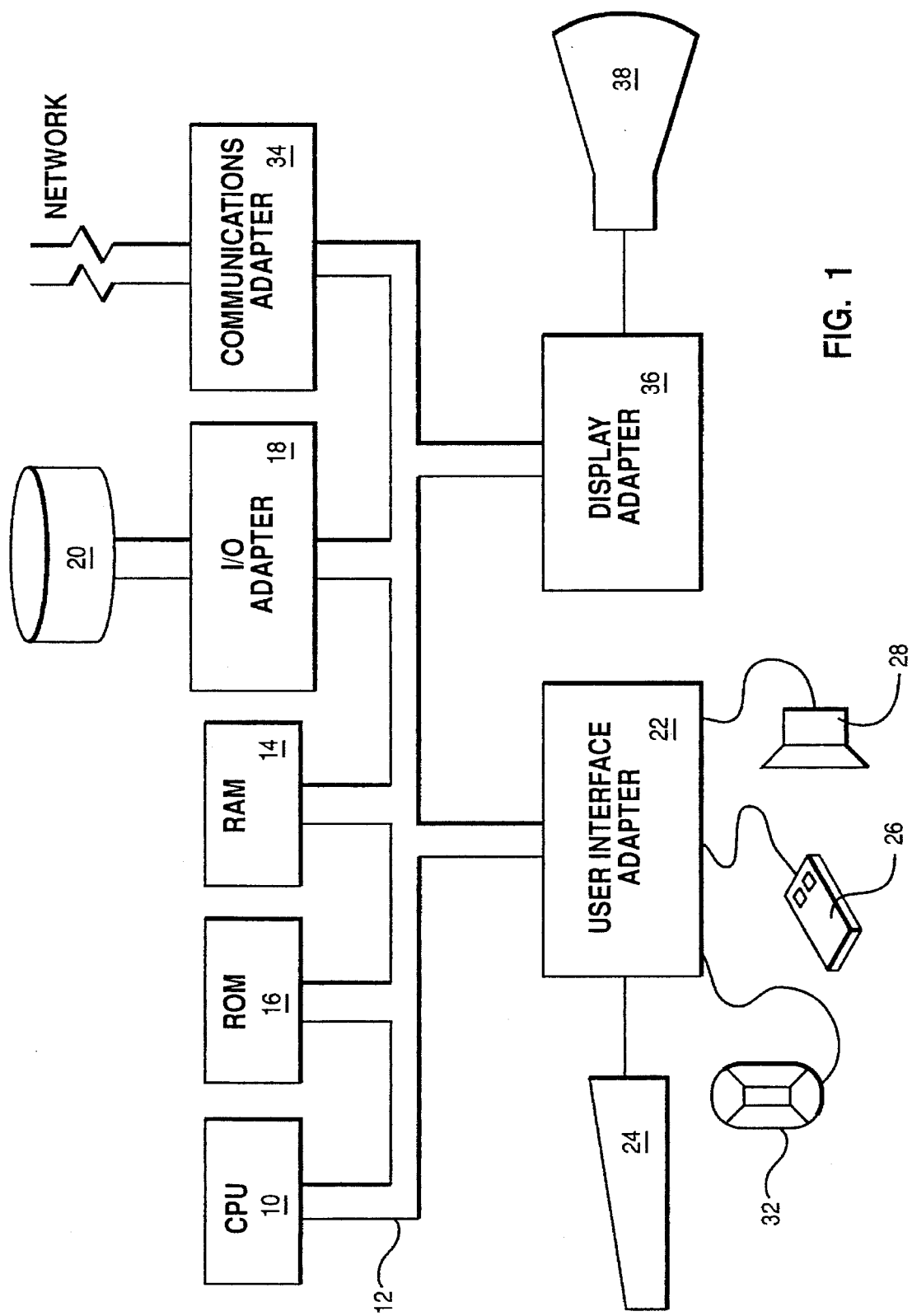
FIG. 1 illustrates a computer system operating in conjunction with the device driver subsystem of the invention.

FIG. 1 illustrates a preferred embodiment of a computer system operating in conjunction with the device driver subsystem herein described with reference to FIGS. 3, 4 and Table 1 for performing the herein described operations of the invention. The system comprises a CPU 10, read only memory (ROM) 16, random access memory (RAM) 14, I/O adapter 18, user interface adapter 22, communications adapter 34, and display adapter 36, all interconnected via a common address/data/and control path or bus 12. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1 include direct memory access (DMA) used to transfer data at high speed from external devices such as DASD 20 or the network shown to the data processing system's RAM 14. As is further shown in FIG. 1, these external devices such as DASD 20 interface to the common bus 12 through respective adapters such as I/O adapter 18. Other external devices, such as the display 38 similarly use their respective adapter such as display adapter 36 to provide data flow between the bus 12 and the display 38 or other device. Various user interface means are provided for interconnection and use with the user interface adapter 22 which, in the figure, has attached thereto representative user input devices such as a joy stick 32, mouse 26, keyboard 24, and speaker 28. Each of these units is well known as such and accordingly will not be described in detail herein.

As will be hereinafter detailed, upon implementation of program code such as that described herein with reference to Table 1 and FIGS. 3 and 4, the system of FIG. 1 will execute the program in order to effect the provision for a single device driver for a multiprotocol environment in accordance with the invention.

Figure 2:
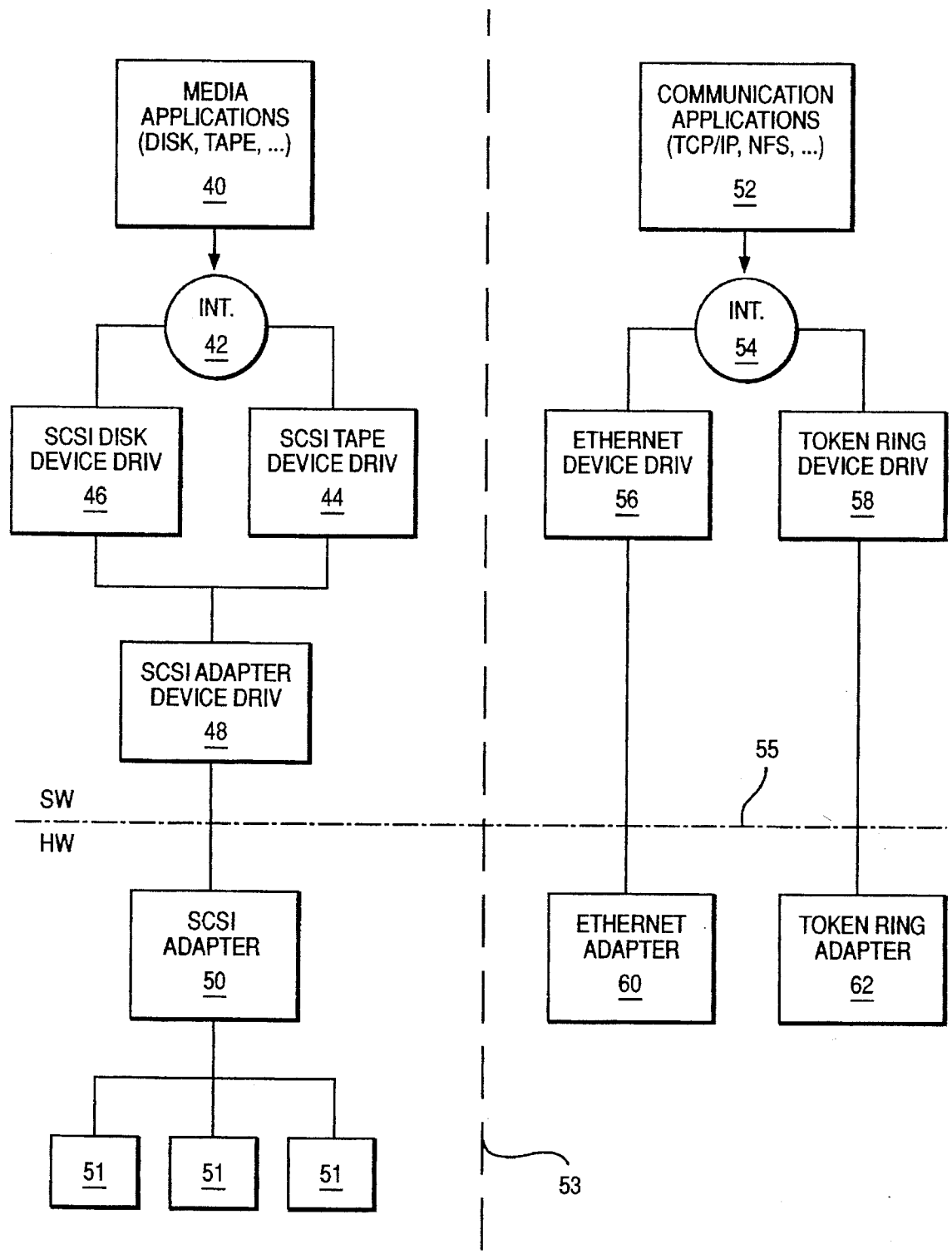
FIG. 2 is a block diagram of a prior art device driver interface subsystem.
Figure 3:
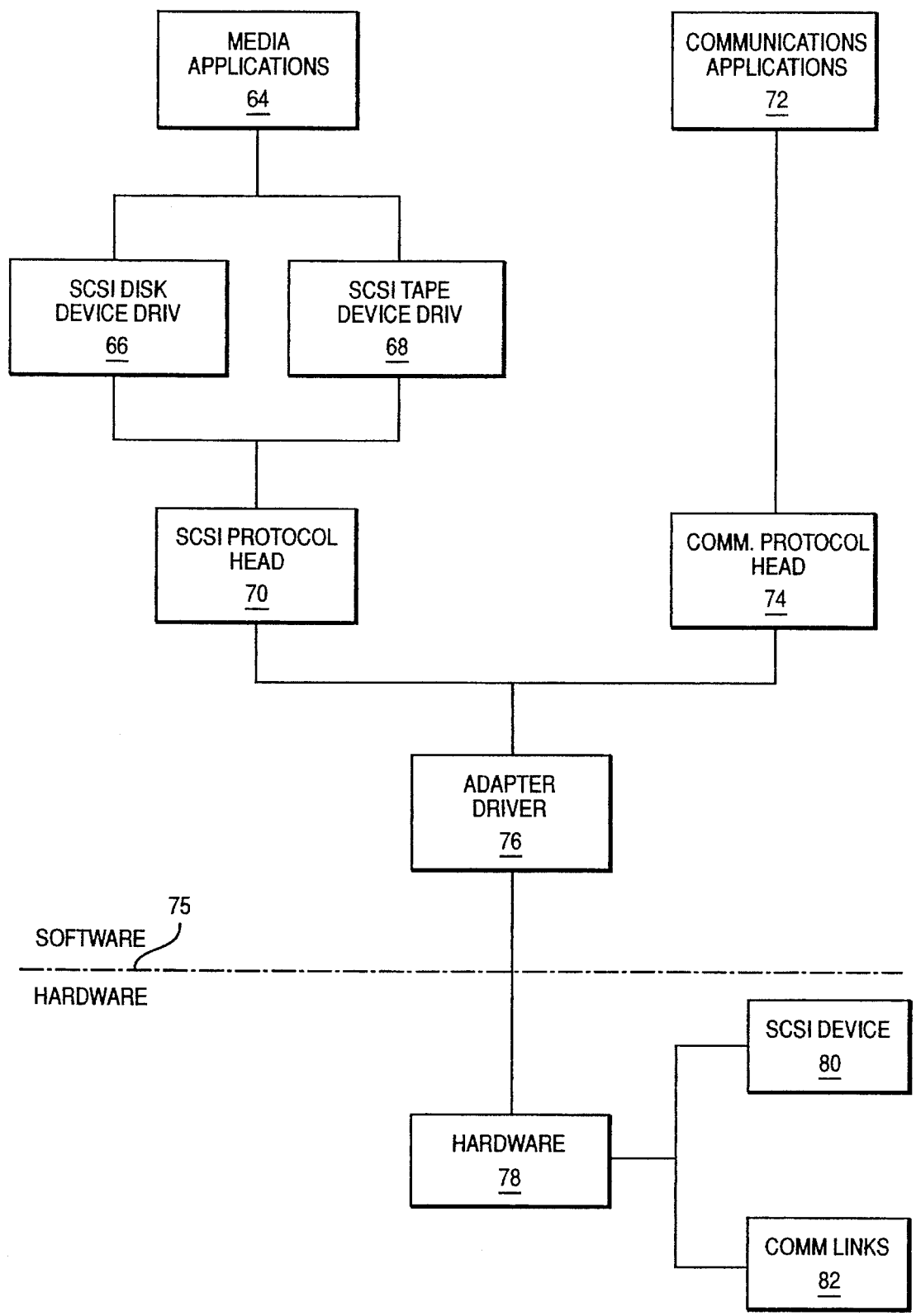
FIG. 3 is a block diagram of the device driver interface subsystem of the invention.
Figure 4:
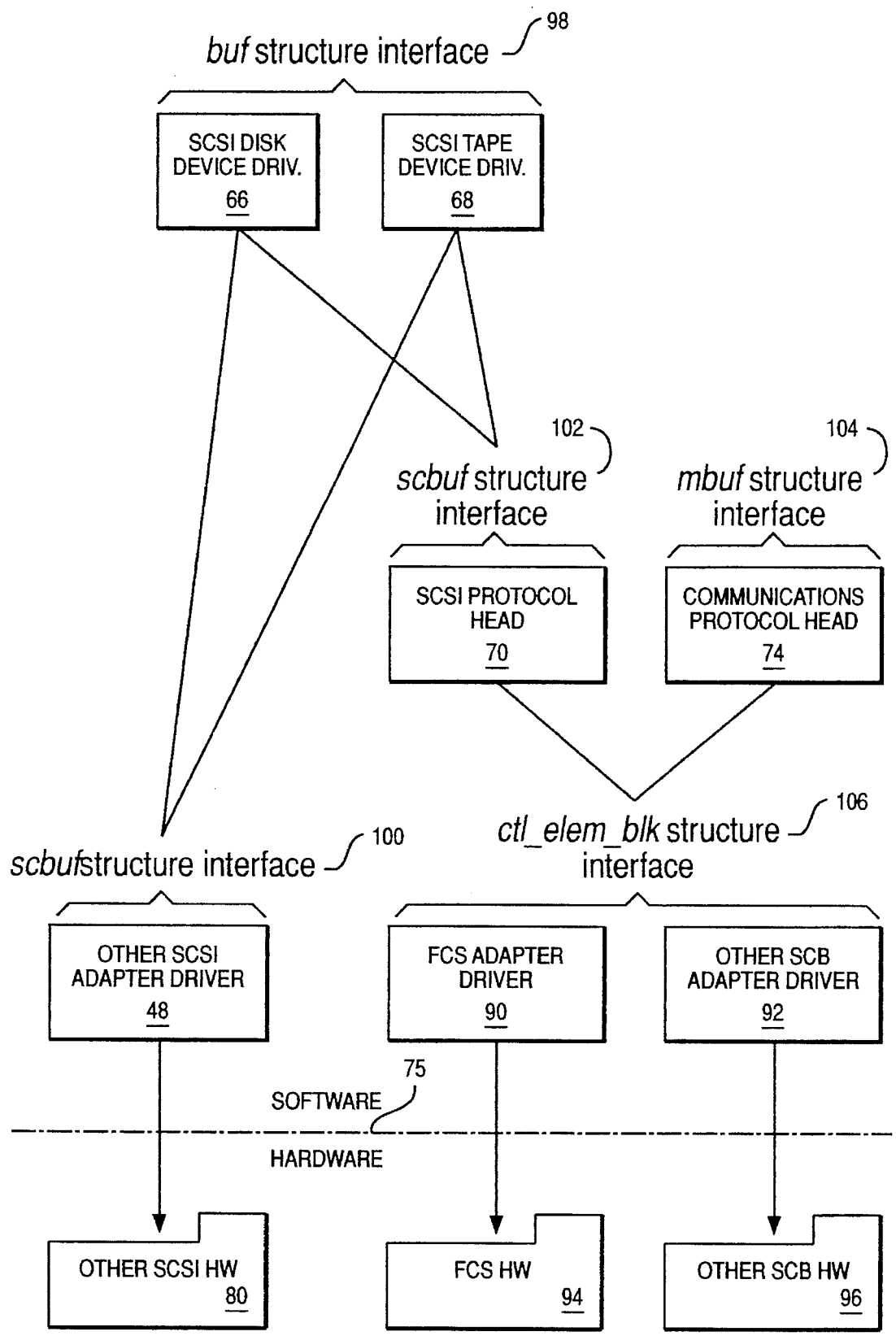
FIG. 4 is another block diagram of the device interface subsystem of the invention.

First a high level discussion will be provided of the overall operation of the invention followed by a more detailed description with reference to FIGS. 2–4. Detailed herein is a unique device driver subsystem interface for use with a multiprotocol device that, in the illustrative embodiment, supports the SCB interface. The SCB architecture (defined in "SCB Architecture Supplement To The IBM Personal System/2 Hardware Interface Technical Reference Architectures", available from the IBM Corporation and incorporated herein by reference) provides a generic queued control block interface to an adapter permitting multiple types of protocols to run over the adapter using the same interface. A fiber channel adapter may be provided employing this interface to support communication protocols such as TCP/IP and media protocols such as IPI-3 or SCSI. Although the implementation described herein is with respect to such an SCB architecture and fiber channel subsystem implementation, it will be readily apparent that the invention is not intended to be so limited and admits to application in other architectures and subsystems. The focus of the invention is on a unique interface allowing multiple protocols, including both media and communications, to run over the same adapter with minimal overhead. Thus, fiber channel is utilized as but an example, and the interface is extendable to other SCB devices and essentially the concept is extendable to any device interface.

In the illustrative embodiment, the basic structure is such that an SCB adapter device driver is provided at the lowest layer which actually enqueues and dequeues the SCB control elements and handles all interrupts from the adapter. The adapter driver also handles buffer management for incoming unsolicited data and further handles all mapping of buffers for DMA. The adapter driver is adapter-specific and tailored to handle the differences in SCB implementations between different adapters. This is the only layer which is hardware dependent. This structure per se is not unique, and is based upon, for example, the SCSI subsystem in the AIX (TM) operating system offered by the IBM Corporation (AIX is a trademark of the IBM Corporation). In this subsystem SCSI device heads (disk, tape, and CD ROM device drivers) may run over a variety of device-specific adapter drivers.

The problem addressed by the subject invention relates to supporting of the aforementioned system over multiprotocol adapters such as an SCB adapter wherein, for example, communications and media protocols are supported. The standard interfaces to media and communication devices is the BUF and MBUF structures hereinafter described. Although the structures are different, they both have several properties in common which will also hereinafter be described in greater detail. The important parts of both structures are the buffer address, buffer length, and cross-memory descriptor needed for mapping the buffer for DMA. In addition, both structures allow the structures to be chained so that the data may be gathered from multiple discontiguous data buffers or scattered to multiple disk contiguous data buffers for incoming data for a single operation.

A key to a successful high-performance interface is to avoid copying data between software layers. In the invention this is accomplished by providing a common CTL_ELEM_BLK structure that a protocol head (such as communications or IPI-3 or SCSI) fills in, with a pointer to a chain of BUF or MBUF structures. The fiber channel implementation described herein supports these two buffer types, although any other description with the basic elements hereinabove listed would be equally possible. The CTL_ELEM_BLK structure definition is shown as follows in Table 1 and will be hereinafter described in greater detail.

TABLE 1

```
struct ctl_elem_blk {
    struct ctl_elem_blk  *next;
    struct ctl_elem_blk  *prev;
    uchar       flags;           /* Flags for this
                                    ctl_elem_blk */
    int         key;             /* used by protocol
                                    head */
    int         status;          /* control element
                                    status */
    int         num_pd_info;     /* number of pd_info
                                    structs */
    int         pds_data_len;    /* Length of data in
                                    pd_infos */
    caddr_t     reply_elem;      /* reply element */
    int         reply_elem_len;  /* Length of reply
                                    element buffer */
    caddr_t     ctl_elem;        /* pointer to ctl elem */
    struct pd_info *pd_info;     /* PD-1 information */
};
struct pd_info {
    struct pd_info *next;
    uint        buf_type;        /* Type of buffer in
                                    p_buf_list */
    uint        pd_ctl_info;     /* First word of
                                    PD-1 */
    uint        mapped_addr;     /* bus address */
    int         total_len;       /* total length of PD */
    int         num_tcws;        /* number of TCWs */
    caddr_t     p_buf_list;      /* List of buffers for this
                                    PD */
```

The SCB architecture is structured such that for each control element, there are possibly multiple buffer descriptors (identified in the art as "Type 1 parameter descriptors") which are utilized to describe the various user buffers. This chain of PD INFO structures contains the pointers to the BUF or MBUF structures (or any other structure that is appropriate for the particular adapter driver to support). The adapter driver will utilize this information to map buffers and to obtain DMA address for the adapter.

The foregoing subsystem thereby provides the advantages of a layered architecture while allowing for flexibility of utilizing current interfaces. This, in turn, means that multiple protocols may run over a single adapter driver and the same protocol head may run over a different adapter supporting this interface.

Still further benefits result from the foregoing interface subsystem of the invention. It may be integrated into existing architecture. For example, the SCSI device heads which run over existing SCSI adapter device drivers may be utilized to run over an SCSI protocol head which, in turn, runs over any adapter which supports the SCSI protocol with this SCB interface.

Moreover, the buffer management, DMA management, and adapter handling may all be centralized in the adapter driver. This permits more efficient allocation of system resources than would be achieved by distributing this work. Moreover, the hardware interface is also isolated in the adapter driver such that changes in an integrated adapter will be isolated to one piece of code.

Turning now to FIG. 2, a functional block diagram is depicted therein showing a multiple protocol stack of the prior art. The figure is divided by the vertical line 53 into two portions. The portion to the left of line 53 illustrates a typical protocol stack of media applications 40 which typically run over disk, tape, or similar devices. The portion of FIG. 2 to the right of line 53 illustrates a typical protocol stack of communication applications 52 which execute over TCP/IP, NFS, or the like. Additionally a horizontal line 55 is provided which indicates the division between software and hardware for the media or communication stack. As will become more apparent with the discussion of FIG. 3, the present invention focuses on the interface layers 42, 54 of FIG. 2.

The term "stack" as used herein simply conveys the notion of a sequence of function calls in order to effect a desired result in hardware originating in, for example, a given application 40, and thus the stack term refers to the process function call stack. In conventional operation, a user application 40 would typically issue a system call which in turn calls a device driver in the kernel of the operating system employed with the computer system of FIG. 1 whereupon the kernel, in turn, eventually issues a call to physical hardware to effect the desired result. FIG. 2 illustrates these various layers of device drivers and hardware. More particularly, representative SCSI tape device driver 44 and SCSI disk device driver 46 are shown which are interfaced to the particular application 40 by means of the interface 42 which includes a BUF structure to be hereinafter detailed. For present purposes, it is sufficient to note that the BUF structure in interface 42 will include 3 major components, namely a pointer to data to be read or written, the size of such data, and a cross-memory descriptor utilized for direct memory access.

Continuing with FIG. 2, a conventional system of the prior art may include an SCSI adapter device driver 48 which has another structure to be described passed to it by device drivers 44, 46. The function of device driver 48 is to interface directly to the hardware such as, in the case of FIG. 2, a SCSI adapter 50 which, due to its presence below the software-hardware line 55, indicates this device driver 48 is interfacing to the actual hardware.

Although in FIG. 2, a representative set of protocol stacks is illustrated therein relating to SCSI, it should be noted that the invention is not intended to be so limited. Consequently, another standard media protocol could be employed equally as well such as IPI-3, well known in the art.

A plurality of individual SCSI devices, 51, is further shown in FIG. 2 which may take the form of a disk drive, tape drive, CD ROM drive, or the like, which is physically interconnected to their respective SCSI adapter(s) 50. From the foregoing it will be seen that a software-hardware chain or media stack is provided for, thereby effecting desired results in the devices 51 as a function as a media application 40 executing in the system of FIG. 1.

Turning now to the right side of FIG. 2, a correlative protocol stack of communications applications 52 is shown to the right of line 53 analogous to that previously described with respect to the media application stack. Similar to the media applications, the communications applications 52 communicate to their respective device drivers such as an Ethernet Device Driver 56 or Token Ring Device Driver 58. An interface 54 between these device drivers and the communication application is provided which typically may include an MBUF structure to be hereinafter described in greater detail. For present purposes, this MBUF structure is different from that of the BUF structure associated with the media stack (e.g. fields may be named differently and the like). However, again 3 components are provided in the MBUF structure common to those in the BUF structure, namely that the MBUF structure will, in like manner, contain pointers to data, size of the data, and a cross-member descriptor for DMA purposes. As in the case of the SCSI device drivers 44, 46, the communication device drivers 56, 58, will employ information in the MBUF structure of the interface 54 to communicate across the software-hardware line 55 to their respective actual hardware adapters, specifically the respective Ethernet Adapter 60 and Token Ring Adapter 62, with respect to Ethernet Device Driver 56 and Token Ring Device Driver 58, respectively. There is thus a 1:1 correspondence between a given device driver and its respective device.

Because of the importance of these three common features of the different structures and protocols addressed by the invention, (pointer to data, length of data and cross-memory descriptor) the reason for their importance will be briefly described. Device drivers may be characterized as a "communication" or a "media" driver depending upon their overall function. However, it is more important to appreciate that rather than their being so characterized it should be simply understood that they differ primarily because of the structures they utilize and because they are simply managing data in different ways.

For example, a teletypewriter or TTY driver could be considered a communication driver but really performs functions of a communication driver plus additional functions such as screen emulation and the like having its own characteristic structures to effect such functions. Similarly, a mouse driver or keyboard driver may perform functions similar to a more conventional communication driver.

However, this is irrelevant to the central point that they are distinguished simply by the fact they must manage data in a different way from other drivers. In other words, the manner in which they communicate with an adapter below them and the resultant data structures utilized to manage such data may differ substantially giving rise to the problem addressed by the invention. Put differently, different applications have different data needs in order to get data from an operating system to an adapter as, for example, in case of a graphics display adapter. How the data is described and transmitted to the adapter thus differs dependent upon the application, the device driver, and how the data is to be passed. All such data must be copied or conveyed in some manner across the bus from the host operating system to the given adapters memory, (such function conventionally being performed by DMA). Accordingly, all such different devices, employing their different structures, must have some mechanism whereby, once they have accessed the lowest level device driver, such DMA may be set up and passed to the adapter where upon the adapter may DMA the data. Such functioning requires pointers to the data, data length, and cross-memory descriptor. Thus, it may be understood why the main three factors hereinbefore described should be present in the given device driver structure in order to enjoy the benefits of the invention, namely the pointer to data, data length, and cross-memory descriptor.

Continuing, with respect to FIG. 3, depicted therein is a block diagram of the system of the invention providing for a multi-protocol device interface subsystem. Included will be hardware below the software-hardware divider line 75 (similar to line 55 of FIG. 2) which may include SCSI devices, communication links, or other hardware intended to operate with the system of FIG. 1. Additionally, above the software-hardware divisor 75 are seen various device drivers, applications and other code modules implemented in software as hereinafter detailed which are also intended to operate with the system of FIG. 1.

Comparison of FIG. 2 and FIG. 3 will reveal several similarities with the prior art system such as the provision for multiple protocol applications, e.g. media applications 64 and communications applications 72. Further similarities exist in provision in FIG. 3 for SCSI disk and tape device drivers 66, 68 and hardware devices such as SCSI device 80 similar to SCSI devices 51 in FIG. 2. A generic hardware block 78 is shown below the divisor 75 with SCSI device 80 and communication links 82 extending therefrom. This extension is only intended to indicate that the hardware block 78 represents generically adapters to any hardware and may have attached thereto a variety of devices such as SCSI device 80 or communication links 82.

Continuing with FIG. 3, it is assumed from the system of FIG. 3 that an adapter has been provided which the system of FIG. 1 must employ in order to support multiple protocols such as media and communication protocols. In accordance with the invention, additional components are provided in FIG. 3 not present in the prior art system of FIG. 2 however. An SCSI protocol head 70 is provided interfacing between device driver 66, 68, and media applications 64. The interface associated therewith is nevertheless still the BUF structure interface present in the interface 42 of FIG. 2. Similarly, a communication protocol head 74 is provided which still nevertheless effects the MBUF interface associated with interface 54 of FIG. 2 and the communications applications 52. The SCSI and communication protocol adapter heads 70, 74, are employed to build a new structure to be hereinafter described—a control element block (not shown in FIG. 3).

The adapter driver 76 (e.g. a device driver which communicates directly to the hardware adapter shown generically as hardware block 78) includes an interface which effects the hereinbefore novel control element block structure. Included in the control element block structure is a generic pointer to a buffer descriptor (P_BUF_LIST) which is a pointer to a list of buffer pointers to be hereinafter described. This pointer may be implemented in numerous ways, but in the preferred embodiment it is a pointer to a chain of BUF structures or a chain of MBUF structures. It is a key point that the protocol heads 70, 74, build such a control element block by setting the pointer to the BUF structures (in the case of protocol head 70) and MBUF structures (in the case of protocol head 74). By doing so, there is no requirement to copy data which, as hereinbefore noted, would adversely effect the high performance of interfaces required with media and communications data. The system of the invention thus only is required to set up a pointer to the chain. Logic is provided in the adapter driver 76 as hereinafter detailed to discriminate between the two different types of pointers to the BUF or MBUF structures employing flags. A flag set by the protocol head 70 or 74 will indicate the type of pointer, whether it be a pointer to a BUF structure or MBUF structure.

As just mentioned, the invention admits to employing a number of different pointers or structures so long as the aforementioned three main characteristics are provided for, e.g. the pointer is provided to point to data, its length, and a cross-memory descriptor for DMA purposes. Thus, any such structure meeting these criteria may be placed in a P_BUF_LIST list pointer with a flag indicating what type of pointer it is (so long as, in a given implementation, the adapter driver 76 understands the type of pointer involved). Thus, the invention is not intended to be limited to specific buffer descriptors or structures such as MBUF or BUF structures.

For the sake of clarity, it will be appreciated that, in accordance with conventional terminology in the computer arts, a buffer descriptor is simply a generic name for such structures as BUF and MBUF utilized to describe a data buffer. The data itself may be a page or other length buffer, and the buffer descriptor simply includes a pointer to such data (as well as containing the aforementioned data length, cross-memory descriptor, and other information as desired).

For purposes of clarity, although the term "cross-memory descriptor" is simply a conventional name for a translation mechanism well known in the art, it will be further described herein. As is well known in UNIX based systems, two basic memory regions are provided for, namely kernel and user memory wherein user applications employ such user memory and kernel applications employ the kernel memory. If it is desired to DMA to user memory and pass data to an adapter card for example, it is necessary in such instances to perform an cross-memory attach, e.g. to invoke a translation mechanism to make such user memory appear like kernel memory—required because the addressing scheme is different for kernel and user memory. In this manner, when an adapter card requires a fetch, the system can access the correct data in user memory. The cross-memory descriptor simply indicates where the data is.

Thus, if kernel memory is passed, such cross-memory descriptor simply indicates it is kernel memory and no translation is required. If, on the other hand, it is user memory, the translation mechanism effected by employing the cross-memory descriptor indicates where such memory is in the user memory—effected by the DMA logic and services. A cross-memory descriptor is passed when the DMA is set up and is thus used to DMA directly to user or kernel memory.

Continuing with FIG. 3, as previously noted, the hardware 78 represents an actual adapter card such as, in a representative implementation, those employed for a Fiber Channel FCS or HIPPI. Such a Fiber Channel is represented as a network indicated by the communication links 82, which may take the form of multiple switches, a direct connection or the like. Connected through the network such as link 82 may be an SCSI or other device 80 as desired. The link 82 represents a target machine if communication is being employed which could even include another fiber channel adapter which is being communicated with.

The control element block (CTL_ELEM_BLK) and the structure contained therein previously noted (PD_INFO) will now be hereinafter described in greater detail with reference to the preceeding Table 1 which contains the definition of the CTL_ELEM_BLK and PD_INFO structures.

Continuing the description of the Table 1 contents, the PD INFO structures includes a P_BUF_LIST pointer which lists the buffers contained in the PD_INFO. Also contained in the PD INFO structure is a flag which gets set describing the type of buffer the P_BUF_LIST is pointing to. The BUF_TYPE parameter in PD_INFO defines the type of buffer being pointed to by the P_BUF_LIST. It is a feature of the invention that the structures herein described relative to TABLE 1 are generic and only implementation-specific in describing the types of buffers which must be supported by the given applications, such as the MBUF and BUF structures hereinbefore described.

In the representative implementation described herein, device driver subsystem interface support is provided for a multiprotocol SCB adapter supporting both communication and media protocols. Although the invention is not intended to be limited to such SCB architecture, for illustrative purposes it will be hereinafter briefly described. This subsystem control block (SCB) architecture was devised to address the aforementioned problem of maintaining cost and simplicity controls in ever-expanding computer systems by providing a generic architecture for an interface to devices. Accordingly, some fields in the CTL_ELEM_BLK and PD_INFO structures are SCB-specific dealing specifically with the SCB architecture (e.g. REPLY_ELEM, REPLY_ELEM_LEN, CTL_ELEM, PD_CTL_INFO). From the foregoing, however it will readily be apparent that the invention does not have to be SCB-specific and these fields are not necessary to an implementation of the invention. In other words, the invention is not specific to SCB architecture but only the particular implementation herein disclosed, in that the invention it admits to application to other architectures.

It will be recalled in a previous discussion regarding Table 1 that a flag is set describing the type of buffer (e.g. BUF, MBUF) which is being employed in a given time. This enables data to flow in FIG. 3 from top level drivers through the bottom level drivers and onto the underlying hardware 78 without being copied more than once (which was the case in prior art systems). From this it should be apparent that a control element block must be built employing existing structures such as BUF and MBUF. Such control element block must be built by drivers such as 66, 68, 70, 74 and provided to the adapter driver 76, FIG. 3. The driver 76 understands which particular type structure is being passed in order to properly transfer the data based upon that structure to the particular hardware device 78. Obviously, as hereinbefore noted, the hardware 78 of the system of FIG. 3, in order to gain the advantage of the invention, must support multiple protocols.

Turning now to a sequence of operation of the invention (described further with reference to FIG. 4) in a first step, a protocol head such as 70 or 74, is passed, as input, from a protocol stack (such as the media stack or communication stack represented by stack 64 or 72 down), respectively, a structure (such as the representative BUF or MBUF) having the three elements of a pointer to data, data length, and cross-memory descriptor.

As a next step, a CTL_ELEM_BLK is constructed such as that shown in Table 1. This block will contain a pointer to the structure thus previously passed in (e.g. a BUF or MBUF structure in the case of the specific implementation herein described). This pointer will be recognized as the P_BUF_LIST pointer in Table 1.

Once this control element block has thereby been constructed, the structure thus built, employing the data in the control element block thereafter accesses data as required and copies it to the hardware adapter 78.

From the foregoing it may now be appreciated that in accordance with the invention unique steps are thereby implemented not present in prior art systems. First, for example, the aforementioned control element structure is constructed. Moreover, two differing pre-existing structures are combined and utilized within the same common control element structure in order to pass down data through the device data chain to the hardware without the necessity of re-copying the data. In other words, facility is provided for a single adapter driver which nevertheless handle information from multiple protocol types. The control element block for describing the data is transferred to the card, and the data pointer within such control element structure is accordingly generic in the sense that a flag may simply be set describing how the data is formatted.

It will be recalled that in prior art systems each hardware device in a system communicated with and understood only one structure. In accordance with the invention, now, however, by employing the CTL_ELEM_BLK structure this facilitates the ability to pass any number of differing structures to the same device driver because of the way data is described within the CTL_ELEM_BLK in a generic fashion. The CTL_ELEM_BLK identifies a data pointer which could truly be a data pointer or, in the alternative, a pointer to any one of a number of different structures which is desired to be passed to the device driver. Thus, the pointer no longer has a specific definition but rather is truly generic, with the particular type of pointer being defined by the flag set by the previously described protocol head. The adapter driver 76 may thus understand as many different flags corresponding to differing structures to be passed as is desired to be implemented.

With respect to the PD_INFOS, as noted they are chained together to essentially describe gather locations. One unit of data which is desired to be sent down the protocol chain could if desired be split up in differing areas of memory wherein each PD_INFO would contain those differing memory locations linked together. In other words, CTL_ELEM_BLK structure could provide multiple PD_INFOS each of a different buffer type with an associated differing location. The buffer type in a first PD_INFO could accordingly be of a type "A" (i.e. P_BUF_LIST could point to this structure A) while the next PD_INFO in the chain could in like manner, point to a different structure "B".

In providing the flexibility of the invention, each unit of data may thus be scattered as multiple locations where one could be a BUF structure and another an MBUF structure. Moreover, each piece of data making up a unit could be of a differing type thereby supporting multiple structures at increased granularity. The invention of course is not intended to be limited to passing buffers of a particular type or group inasmuch as the notion is to pass a chain of buffers of different types within the same control element block.

Turning to FIG. 4 a hybrid illustration is provided interrelating the components of FIG. 3 to the various interface structure hereinbefore discussed particularly with respect to Table 1. The familiar software/hardware demarcation line 75 is shown, above which are depicted the protocol stacks associated with media and communications data also as previously described.

More particularly, the SCSI disk and tape drivers 66, 68 are shown which, in a conventional fashion would interface through an SCSI adapter 48 employing an SCBUF structure interface 100 to SCSI hardware 80. As in the case of FIG. 3, the previously described SCSI protocol head 70 for media applications and communications protocol head 74 for communication applications are shown. It will be recalled that each media and communication application has associated therewith a corresponding data structure, and more particularly a BUF structure (in the case of media) and MBUF structure (in the case of communications). The common interface of the media SCSI drivers 66, 68 are shown as the BUF structure interface 98 which interfaces through the SCBUF structure interface 102 to the SCSI media protocol head 70. Similarly, the communications protocol head 74 has associated therewith, accordingly, the MBUF structure interface 104.

It will further be recalled that a feature of the invention is to provide a common CTL_ELEM_BLK structure that various protocol heads (such as the communications or media heads shown in FIG. 4) could fill in with a pointer to a chain of differing structures such as the BUF or MBUF structures. Accordingly, such a CTL_ELEM_BLK structure interface 106 (detailed in Table 1) is shown in FIG. 4 providing this common structure that the protocol heads 70, 74 will fill in. This common CTL_ELEM_BLK structure will then, in the manner previously described, be employed in the various hardware drivers such as FCS adapter driver 90 and any other adapter driver such as the SCB adapter driver 92, to drive their respective hardware (shown in FIG. 4 as an example as the corresponding FCS hardware 94 and other SCB hardware 96).

It will be recalled that the control element block has a chained list of parameter descriptor information and corresponds to the previously described chained list of structures such as MBUF and BUF structures. It will be assumed that the system is required to transmit a packet of data. It is assumed that this data is dispersed in different areas of memory. Each such PD_INFO is thus employed to be representative of one of such areas whereby all such PD_INFOs, taken together, thereby define the unit or packet of data which the system is in need of transmitting. In passing it will be noted that the BUF and MBUF structure definitions are well known in the art and provided in UNIX systems in the form of conventional include files BUF.H and MBUF.H and accordingly are not to be described in detail herein.

Although the applications described herein has involved an embodiment implementing DMA, the invention is not intended to be so limited. As is well known in the art, another conventional manner for transferring data across a bus to an adapter is by means of programmed IO ("PIO")-simply a different manner of copying data across the channel wherein the CPU controls copying across the bus instead of the device bypassing the CPU and obtaining data directly from memory. It will be appreciated that the invention will operate both in such PIO as well as DMA environments and thus is not intended to be limited to DMA environments, (a difference being in a PIO implementation the aforementioned cross-memory descriptor is not required).

While the invention has been shown and described with reference to particular embodiments thereof, it will be understood by those skilled in the art that the foregoing and other changes in form and detail may be made therein without departing from the spirit and scope of the invention.

We claim:

1. A method for interfacing to adapter hardware in a multiprotocol computer system environment having a plurality of different interfaces comprising:

passing from a plurality of different protocol stacks at least two different structures to corresponding different protocol heads, each of said at least two different structures being comprised of a structure for a different interface of said plurality of different interfaces;

generating a common interface structure with said different protocol heads containing pointers to said two different structures so as to accept with said common structure said at least two different structures, said at least two different structures each including a pointer to a buffer address, a pointer to a buffer length, and a cross-memory descriptor; and passing said common structure to said adapter hardware through said plurality of different interfaces.

2. The method of claim 1 wherein said common structure is a control element block.

3. The method of claim 2 further including actuating said adapter hardware in response to said passing said common structure to said adapter hardware.

4. The method of claim 1 wherein a first interface is to a communication device comprising said adapter hardware.

5. The method of claim 7 wherein said second interface is to a media device comprising said adapter hardware.

6. The method of claim 1 wherein said two different structures comprises a BUF structure and an MBUF structure.

7. The method of claim 1 further including generating a plurality of control elements; and generating a plurality of buffer parameter descriptors for each of said control elements describing a corresponding plurality of user buffers.

8. The method of claim 7 wherein said plurality of buffer parameter descriptors comprises a chain of parameter descriptor information structures.

9. The method of claim 8 wherein each of said parameter descriptor information structures include pointers to said at least two different structures.

10. The method of claim 1 wherein said plurality of different protocol stacks comprises a media stack and a communication stack.

* * * * *

UNITED STATES PATENT AND TRADEMARK OFFICE
CERTIFICATE OF CORRECTION

PATENT NO : 5,590,313
DATED : Dec. 31, 1996
INVENTOR(S) : Reynolds et al

It is certified that error appears in the above-identified patent and that said Letters Patent is hereby corrected as shown below:

Column 13, line 3: change "7" to -- 1 --.

Signed and Sealed this

Sixteenth Day of February, 1999

Attest:

Attesting Officer

*Acting Commissioner of Patents and Trademarks*